United States Patent [19]
Shiota

[11] Patent Number: 4,930,009
[45] Date of Patent: May 29, 1990

[54] METHOD OF MAKING A PRINT OF COLOR SLIDE

[75] Inventor: Kazuo Shiota, Kanagawa, Japan

[73] Assignee: Fuji Photo Film Co., Ltd., Kanagawa, Japan

[21] Appl. No.: 207,977

[22] Filed: Jun. 17, 1988

[30] Foreign Application Priority Data

Jun. 19, 1987 [JP] Japan .............................. 62-152980

[51] Int. Cl.⁵ .......................... H04N 1/23; H04N 1/46
[52] U.S. Cl. ......................................... 358/76; 358/80
[58] Field of Search ...................... 358/75, 76, 78, 80; 355/20, 32, 55; 353/101

[56] References Cited

U.S. PATENT DOCUMENTS

| | | | |
|---|---|---|---|
| 4,645,351 | 2/1987 | Seto | 356/443 |
| 4,679,074 | 7/1987 | Sugiura et al. | 358/80 |
| 4,729,015 | 3/1988 | Wagensonner | 358/76 |
| 4,779,988 | 10/1988 | Horiguichi | 356/445 |

Primary Examiner—James J. Groody
Assistant Examiner—Robert M. Bauer
Attorney, Agent, or Firm—Sughrue, Mion, Zinn, Macpeak & Seas

[57] ABSTRACT

A color slide printing method produces image signals representing a positive image of a color slide using a color TV camera, converts the positive image signals into negative image signals for each of three colors using a contrast transfer circuit, sequentially displays the negative image signals for the three colors as black-and-white negative images in a brightness pattern on a black-and-white CRT while respectively inserting red, green and blue filters, each independently of the other two, in the printing optical path. The filtered black-and-white negative images expose color photographic paper. The positive image signals are sent to a color monitor to display thereon a positive color image of the color slide for visual inspection. When the positive color image on the color monitor is fuzzy or out of focus, the slide is considered to be positioned front side back, and the color TV camera is readjusted to focus on the back side of the color slide and the image signals are electronically converted so as to display mirror images on the black-and-white CRT and the color monitor.

14 Claims, 3 Drawing Sheets

METHOD OF MAKING A PRINT OF COLOR SLIDE

BACKGROUND OF THE INVENTION

The present invention relates to a method of making a print of a color slide and more particularly to a method of making a print of a color slide using a color TV camera and a black-and-white CRT.

As is well known, color slides are made by mounting single transparencies cut from a processed reversal film in cardboard or plastic mounts. Most color slides are projected by photographic projectors onto screens for viewing. Color slides are also sometimes used to make prints. To make prints from a color slide, there are two available methods, one using color reversal photographic paper and the other using internegative film. In the former method, a positive image of the color slide is recorded on the color reversal photographic paper. In the latter method, the positive image of the color slide is recorded on the internegative film, then a color image of the internegative film is recorded on color photographic paper.

In the case of making prints from color slides which are in mounts, if the slide is placed in the negative or slide carrier of a printer wrong side up, the mirror image of the slide is projected onto the color photographic paper, and the mirror image is unfocused because the distance of the image plane of the color slide from the front surface of the mount and the distance from the back surface are different. The usage of either color reversal photographic paper or internegative film increases the cost of a print. Furthermore, in the case of using color reversal photographic paper, prints are subject to the effects of shading.

OBJECT OF THE INVENTION

It is, therefore, an object of the present invention to provide a method of making a color print from a color slide in which a sharp and correct image of the color print is provided even when the color slide is placed in the printer the wrong way around.

It is another object of the present invention to provide a method of making a color print from a color slide at low cost.

SUMMARY OF THE INVENTION

The above object of the invention can be accomplished by providing a method of making a color print which comprises producing positive image signals of the color slide in three colors using a color TV camera, converting the three color positive image signals into three color negative image signals, sequentially displaying the three color negative image signals as black-and-white negative images or brightness patterns on a black-and-white CRT while sequentially inserting three color filters, namely red, green and blue filters, each independently of the other two, in front of the CRT. so as to change the black-and-white negative images into three monocolor negative images to which a color photographic paper is exposed according to a three color sequential exposure method.

The positive image signals of the color slide are displayed on a color monitor for visual inspection. When the color image on the color monitor is out of focus or fuzzy, the color TV camera is readjusted to focus on the back side of the color slide and the positive image signals taken by the readjusted color TV camera are electronically converted into mirror image and negative image signals so as to display a black-and-white mirror image of the color slide on the black-and-white CRT.

In the printing method according to the present invention a black-and-white CRT is used to sequentially display three monocolor image signals as black-and-white images in a brightness pattern thereon. The black-and-white CRT images are sequentially converted into monocolor images to which a color photographic paper is exposed according to a three color sequential exposure method. The use of such a black-and-white CRT alloWs the use of the usual color photographic paper, which is cheap in comparison with internegative films or reversal photographic paper.

According to a preferred embodiment of the present invention. A color monitor is used to display a positive image for visual inspection. When the positive image displayed on the monitor is out of focus or fuzzy, the color TV camera is readjusted to focus on the back side of the color slide and positive image signals of the back side of the color slide are converted to display negative mirror images on the black-and-white CRT in a brightness pattern for each of the three colors. To display the mirror image on the black-and-white CRT, raster scanning of the black-and-white CRT is effected in the opposite direction with respect to the usual raster scanning direction or the image signals, which are memorized in a frame memory, are read out in the reverse order with respect to the read-in order.

BRIEF DESCRIPTION OF THE DRAWINGS

The above and other objects and features of the present invention will be apparent to those skilled in the art from the following description taken in conjunction with a preferred embodiment thereof, with reference to the accompanying drawings, in which.

DETAILED DESCRIPTION OF THE INVENTION

Figure 1:
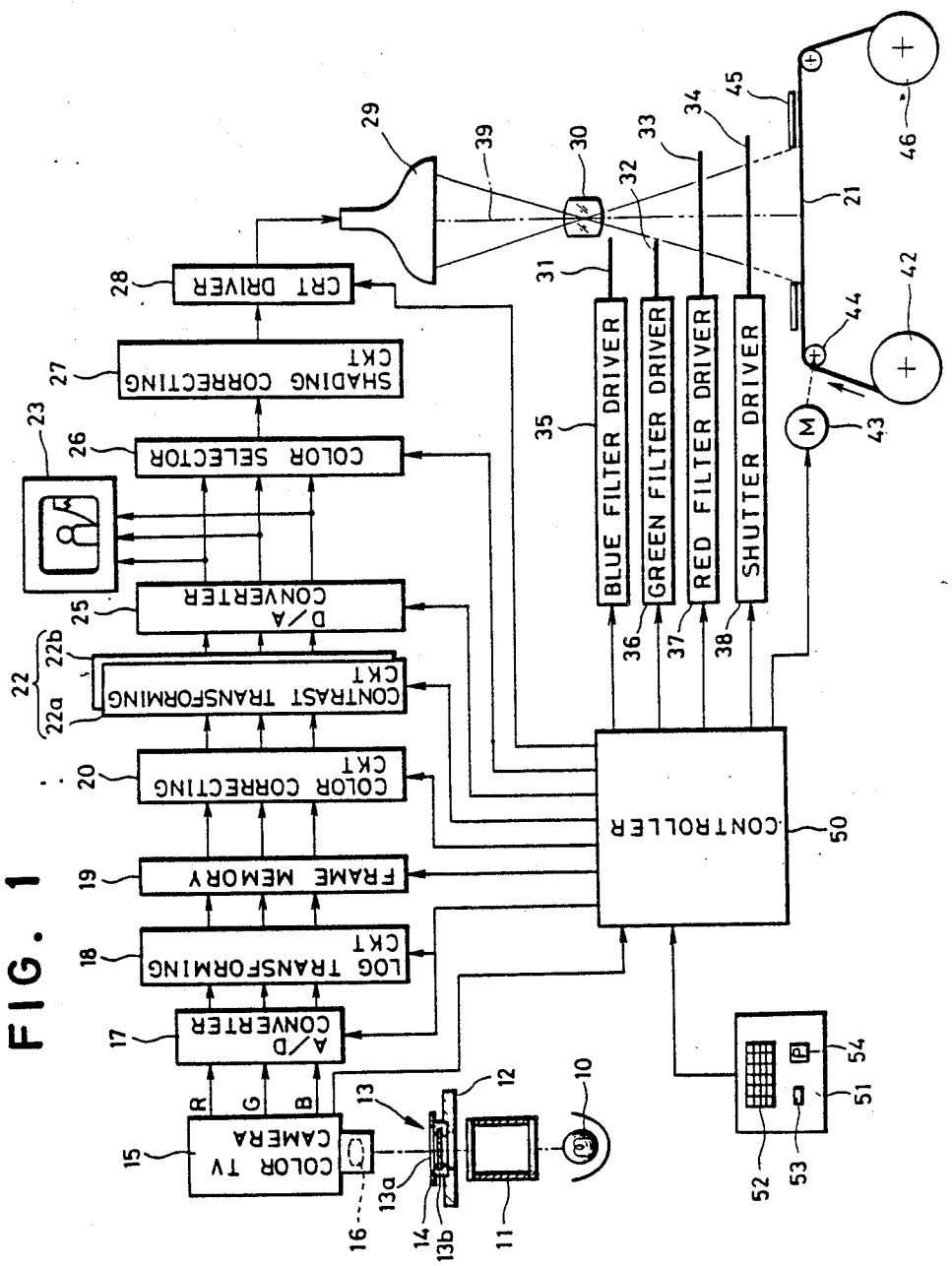
FIG. 1 is a schematic block diagram showing a color video printer in which the method of the present invention is embodied.

Referring now to FIG. 1, shown therein is a color video printer with which the method according to the present invention is embodied. As shown, in the color video printer, there is a slide carrier stage 12 on which is placed a color slide 13 comprising a single frame of processed color reversal film 13a (which is hereinafter referred to as a transparency for simplicity) mounted in a mount 13b. A masking frame 14 presses the color slide 13 down against the slide carrier stage 12 so as to keep it flat. Below the slide carrier stage 12, there is a light source 10 such as a white lamp for providing white light which passes through a mirror box 11 Well knoWn per se and is diffused thereby. The diffused white light, after passing through the color slide 13 and the masking frame, is focussed on an image pickup device (not shoWn) of a color TV camera 15 by means of the lens 16. It is to be noted that the lens 16 is generally set up to focus the image of a transparency 13a in the mount 13b when the color slide 13 is placed in the carrier the right way around, i.e., properly mounted in particular, in such a way that the front side of the transparency (the side on which a positive image is formed) faces the lens. Therefore, if the color slide 13 is placed on the carrier stage 12 front side back, i.e. invertedly mounted the lens 16 must be adjusted to change the object distance. Although the adjustment of the lens 16 is usually made automatically by a motor (not shown). the adjustment may be made manually by the operator as well in a known manner.

The color TV camera 16 obtains an image of the color slide 13 according to a three color separation system to provide A/D converter 17 with image signals in three colors, namely red, green and blue. The three color image signals, after having been separately converted into digital form in the A/D converter 17, are logarithmically transformed by a logarithmic transformer 18. The image signals in the form of logarithms are memorized in a frame memory 19, color by color. The three color image signals are read out of the frame memory 19 for color correction in a color correction circuit 20. In the color correction circuit 20, a matrix operation is performed using the color image signals as variables to correct for the difference between the spectral sensitivities of the imaging system of the color TV camera and the color photographic paper on which an image of the color slide is to be printed. The corrected color image signals for each of the three colors are then subjected to gray scale modification or contrast transformation in a contrast transforming circuit 22, so as to match the tonal transfer characteristics of the color photographic paper 21. The contrast transforming circuit 22 comprises a look-up table memory 22a provided in association with a color monitor 23 and a look-up table memory 22b provided in association with an exposure CRT 29. The monitor look-up table memory 22a carries table data for correcting the contrast of a positive image to be displayed on the color monitor 23. The exposure look-up table memory 22b carries table data for performing a contrast transform on an image and positive-negative conversion of the image.

The contrast transformed image signals, after being converted into analog signals in D/A converter 25, are transferred to both the color monitor 23 and a color selector 26. As is well known, the color selector 26 selectively sends the three color image signals to a shading correction circuit 27 for shading correction. The shading correction circuit 27 generally comprises a RAM which memorizes shading correction data, a D/A converter for changing the shading correction data read out from the RAM into analog signals, and adding means for adding the shading correction data, in the form of an analog signal, to the image signals selected by the color selector 26. The image signals for each color, after shading correction, are sent to a CRT driver 28 to be displayed as a black-and-white image in a brightness pattern on black-and-white CRT 29 to which the color photographic paper 21 is exposed. Such black-and-white CRT images are sequentially displayed, each for a predetermined proper exposure time.

Each black-and-white CRT image on the CRT 29 is properly enlarged and projected onto the color photographic paper 21 by the printing lens 30. Between the printing lens 30 and the color photographic paper 21, there are three color filters 31, 32 and 33, namely blue, green and red filters, each controlled so as to be inserted into the printing path 39 independently of the other two by drive controllers 35 to 37 provided for each filter. A shutter 34 is also controllably inserted into the printing path 39 by a drive controller 38. With the color filters 31, 32, 33, each black-and-white CRT image in a brightness pattern is converted into a corresponding monocolored image. In FIG. 1, the red filter 33 and the shutter 34 are shown inserted in the printing path 39.

The color photographic paper 21, which is wound around a supply reel 42, is withdrawn by a power driven withdrawing roller 44 by one frame length every exposure so as to place an unexposed part thereof in an exposure position. The photographic paper 21 in the exposure position is sequentially exposed to the three black-and-white CRT images displayed on the black-and-white CRT 29, with the respective filters intervening therebetween. As a result, a latent color image is formed in the color photographic paper 21. The exposed color photographic paper 21 is wound onto a take-up reel 46 and, thereafter, subjected to bulk processing and cut into single prints.

It is to be noted that the elements from the A/D converter 17 through the D/A converter 25 are provided one for each color. It is further to be noted that table data for the logarithmic transformer 18, the color correction circuit 20 and the contrast transfer circuit 22 are stored in and selectively retrieved from a controller 50 to write to these circuits. The controller 50 comprises a computer which controls the operations of the respective elements. Connected to the controller 50 is a keyboard 51 having keys for instructing color correction and/or density correction, a key 53 for instructing a mirror image operation, and a key 54 for starting printing.

The correction key 52 is operated to rewrite table data in the contrast transform circuit 22 so as to adjust color and density. The mirror image instructing key 53 is operated when the color slide is placed front side back in the carrier stage 12. If the mirror image instruction key 53 is operated, the lens 16 of the color TV camera 15 is automatically adjusted to change the object distance so as to be focused on the front side of the slide 13 placed front side back, and the image signals in the frame memory 19 are read out in the reverse order or the raster scanning of the color monitor 23 and the black-and-white CRT 29 is effected in the reverse direction. The printing key 54 is operated to perform the three color sequential exposure of the color photographic paper.

In the sequential operation of the video printer of FIG. 1, the color slide 13 to be printed is first placed right way around in the carrier stage 12 and held flat by the masking frame 14. While illuminating the color slide 13 with the white light emanating from the light source 10, the image of the color slide 13 is focused on the image pickup means of the TV camera 15 through the camera lens 16 to provide three color image signals. As was previously described, the three color image signals are, after having been processed by the A/D converter 17 and the logarithmic transformer 18, written in the frame memory 19 color by color.

The three color image signals are read out picture element by picture element but simultaneously from the frame memory (memories) 19 and sent to the color correction circuits 20 for subjection to the matrix operation. The three color image signals after color correction are then transformed in contrast in the contrast transform circuit 22 with reference to the monitor look-up table memory 22a and, thereafter, displayed as a positive color image on the monitor 23 for visual inspection.

When the positive color image is sharply displayed on the color monitor 23, the color slide 13 is determined to be placed the right way around on the carrier stage 12. On the other hand, if the positive color image on the color monitor 23 is fuzzy, the color slide is determined to be placed front side back in the carrier stage 12. Therefore, when fuzzy image is viewed on the color monitor 23, the mirror image instructing key 53 is operated so as to readjust the focus of the lens 16 of the color TV camera 15 and to form an electronically reversed image by either reading out image signals in the reverse order from the frame memory 19 or by reversing the raster scanning direction of the CRTs.

Next, inspection is made with respect to the color balance and density of the positive color image displayed on the color monitor 23. If the color balance and density of the positive color image is lean, the color correction keys are operated to enter proper color correction data to rewrite the table data in the contrast transform circuits 22 so as to display a desirably color corrected positive image on the monitor CRT 23.

After these image inspections, the printing key 54 is operated to make a color print of the color slide 13. Upon the operation of the printing key 54, the look-up table memory 22b is selected to effect contrast transform and negative-positive conversion for the image signals read out from the frame memory 19 after color correction. The image signals output from the look-up table memory 22b are, after having been converted into analog form by the D/A converter 25, sent to the color selector 26.

Figure 2:
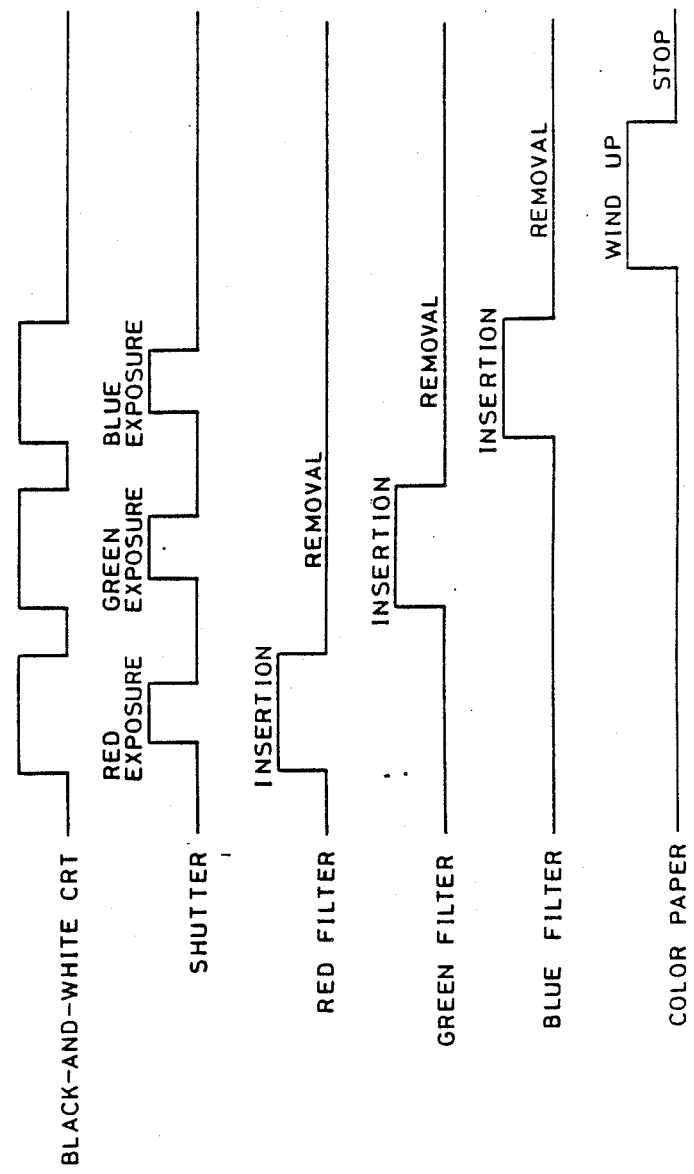
FIG. 2 is a time chart showing the timing at which various elements of the video printer of FIG. 1 are actuated.

The color selector 26 at first selects and sends the red image signals to the shading correction circuit 27 to eliminate a small amount of shading of the red image which can not be cancelled even by the negative-positive conversion and, thereafter, sends the red image to the CRT driver 28. As is shown in FIG. 2, upon receiving the red image signals, the CRT driver 28 causes the black-and-white exposure CRT 29 to display the red image signals as a black-and-white image in the form of a brightness pattern thereon for a predetermined time. At this time, the filter drive controller 37 is caused to insert the red filter 33 into the printing path 39 to convert the black-and-white image displayed as a brightness pattern on the black-and-white CRT 29 into a red image which is projected and focused on the color photographic paper 21 by the printing lens 30 during the shutter opening time. As a result, a red latent image is formed in the color photographic paper 21.

After the exposure of the red image, the color selector 26 selects the green image signals and displays the same as a black-and-white image in a brightness pattern in the same way as was described for the red image. Upon selecting the green image signal, the green filter 32 is inserted in the printing path 39 in place of the red filter 33, to convert the black-and-white image on the black-and-white CRT 29 into a green image. In the same way as described above, a green latent image is formed over the red latent image in the color photographic paper 21. In the same way, a blue latent image is formed over the red and green latent images in the color photographic paper 21.

When the three color latent images of the color slide 13 are formed in the color photographic paper 21 via three sequential exposures, the motor 43 is actuated to wind the color photographic paper 21 by one frame onto the take-up reel 46 and to place an unexposed part thereof in the exposure position.

Figure 3:
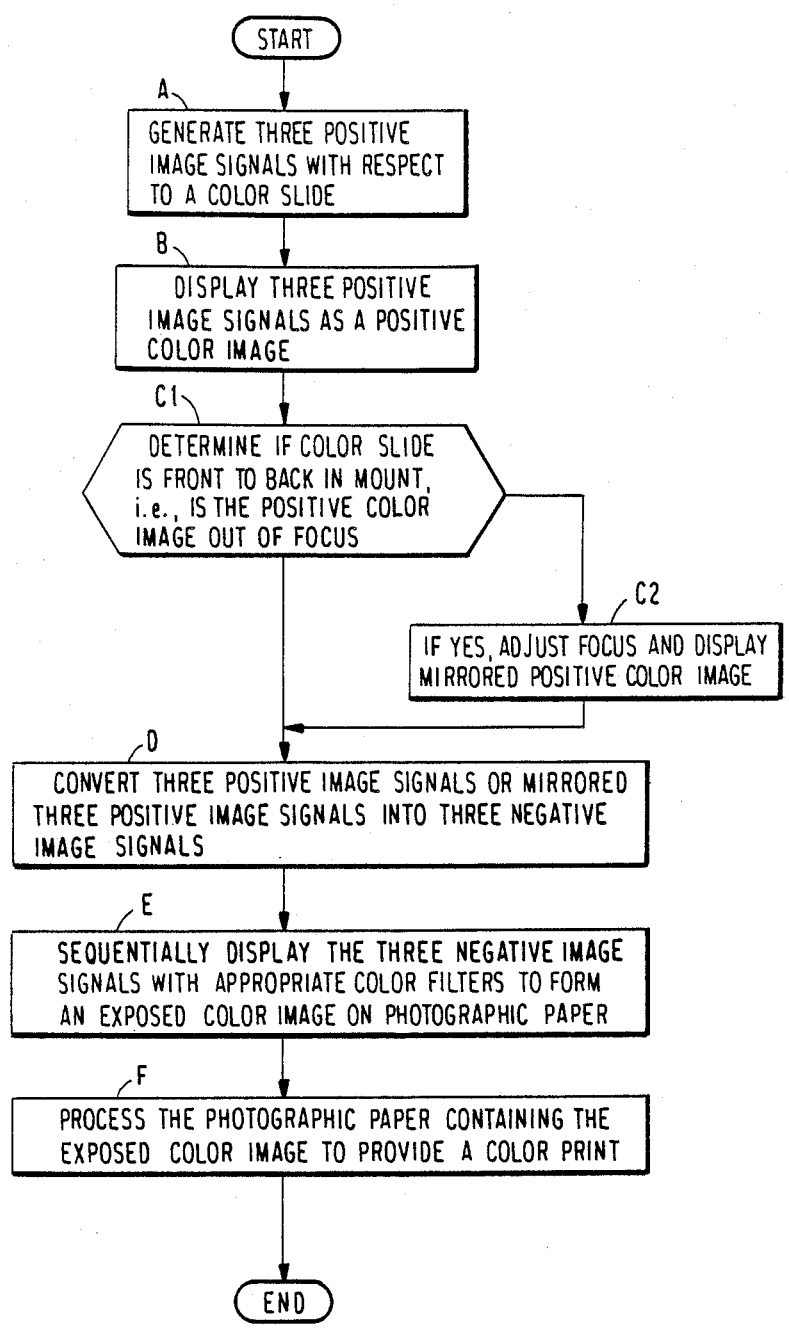
FIG. 3 is a flowchart of one embodiment of the invention.

The above-described operation is summarized in the flow chart shown in FIG. 3.

Although the present invention has been fully described by way of a preferred embodiment thereof with reference to the accompanying drawings, it is to be noted that various changes and modifications will be apparent to those skilled in the art. Therefore, unless otherwise noted, such changes and modifications depart from the scope of the present invention as defined by the appended claims, they should be construed as included therein.

What is claimed is:

1. A method of making a color print from a color slide, comprising the steps of:
    generating red, green and blue sets of positive image signals, together representing an image of the color slide, using a color TV camera;
    displaying said sets of positive image signals as a positive color image on a color monitor;
    determining if said color slide is invertedly mounted by monitoring the focus of the image on said color monitor, and, if out-of-focus, readjusting said color TV camera to focus on a back side of said color slide, and electronically converting said sets of positive image signals so as to display a mirror image of said positive color image on said color monitor;
    converting said red, green and blue sets of positive image signals into respective negative image signals if said color slide is determined within said determining step to be properly mounted, and said red, green an d blue sets of positive image signals into negative mirror image signals if said color slide is determined within said determining step to be invertedly mounted;
    sequentially displaying said negative image signals if said color slide is determined within said determined step to be properly mounted and said negative mirror image signals if said color slide is determined within said determining step to be invertedly mounted, as black-and-white negative image on a black-and-white CRT so as to expose a color photographic paper to said black-and-white negative images through respective red, green and blue filters, each sequentially inserted between said black-and-white CRT and said color photographic paper independently of the other two, thereby forming three monocolor latent images overlapping one another in said color photographic paper; and
    processing said exposed color photographic paper to provide a color print of said color slide.

2. A method as defined in claim 1, wherein said red, green and blue sets of positive image signals are converted to negative image signals in contrast transformation circuit means.

3. A method as defined in claim 1, wherein said generating step comprises the steps of converting said positive image signals output by said color TV camera into digital form, logarithmically transforming said digitized positive image signals, and storing the transformed image signals in frame memory means prior to said converting step.

4. A method as defined in claim 3, further comprising the step of color correcting said transformed image signals by compensating for differences in spectral sensitivity as between the color TV camera and the color photographic paper.

5. A method as defined in claim 4, wherein said color correcting step is performed prior to said converting step.

6. A method as defined in claim 3, further comprising the step of D/A converting said negative image signals from digital to analog form thereby to form analog negative image signals, performing shading correction upon said analog negative image signals, and forwarding resultant analog negative image signals, color by color, to said black-and-white CRT.

7. A method of making a color print from a color slide, comprising the steps of:
generating three color positive image signals which together are representative of an image of the color slide using a color TV camera;
displaying said three color positive image signals as a positive color image on a color monitor;
determining if said color slide is invertedly mounted by monitoring the focus of the image on said color monitor, and, if out-of-focus:
readjusting said color TV camera to focus on the back side of said color slide;
electronically converting said three color positive image signals so as to display a mirror image of said positive color image on said color monitor;
converting said three color positive mirror image signals into three color negative mirror image signals;
sequentially displaying said three color negative mirror image signals as black-and-white negative images on a black-and-white CRT, so as to expose a color photographic paper to said black-and-white negative images through respective red, green and blue filters, each of which is sequentially inserted between said black-and-white CRT and said color photographic paper independently of the other two, to thereby form three color latent images overlapping one another in said color photographic paper; and
processing said exposed color photographic paper to provide a color print of said color slide.

8. A method as defined in claim 7, wherein said positive image signals are stored in a first order in frame memory means and are read out in reverse order from said frame memory means in order to provide said mirror image of said positive color image on said color monitor.

9. A method as defined in claim 7, wherein raster scanning of said color monitor and said black-and-white CRT is effected in a direction reverse to a normal direction so as to display said mirror image of said positive color image.

10. A method as defined in claim 7, wherein said positive image signals are converted to negative image signals in contrast transformation circuit means.

11. A method as defined in claim 7, wherein said generating step comprises the steps of converting said positive image signals output by said color TV camera into digital form, logarithmically transforming said digitized positive image signals, and storing the transformed image signals in frame memory means prior to said displaying step.

12. A method as defined in claim 11, further comprising the step of color correcting said transformed image signals by compensating for differences in spectral sensitivity as between the color TV camera and the color photographic paper.

13. A method as defined in claim 11, further comprising the step of converting said negative mirror image signals from digital to analog form, performing shading correction upon said analog negative mirror image signals and forwarding resultant analog negative mirror image signals, color by color, to said black-and-white CRT.

14. A method as defined in claim 7, wherein said positive mirror image signals are converted into said negative mirror image signals by contrast transforming circuit means, and further including the step of contrast-correcting said positive image signals and said positive mirror image signals, using said contrast transforming circuit means, prior to displaying the same on said color monitor.

* * * * *